Patented Mar. 9, 1948

2,437,648

UNITED STATES PATENT OFFICE 2,437,648

CATALYTIC OXIDATION OF UNSATURATED ORGANIC COMPOUNDS

Nicholas A. Milas, Belmont, Mass., assignor to Research Corporation, New York, N. Y., a corporation of New York No Drawing. Application September 15, 1943, Serial No. 502,525

11 Claims. (Cl. 260—617)

This invention relates to the catalytic oxidation of unsaturated organic compounds, and its principal object is to provide a simple, economical and efficient process of producing useful oxygenated organic compounds such as glycols, phenols, aldehydes, ketones, quinones and organic acids.

Further objects will be apparent from a consideration of the following description wherein I have illustrated the application of my new process in the preparation of various substances constituting the class of oxygenated organic compounds.

The term "unsaturated organic compound" and derivatives thereof, as herein used, is confined to compounds embodying an unsaturation between carbon atoms, such for example as the olefins, aromatic hydrocarbons, acetylene, compounds of the general formula R—C≡CH, wherein R represents a monovalent hydrocarbon radical, and compounds of the general formula R—C≡C—R₁ wherein R and R₁ represent monovalent hydrocarbon radicals, and the term "oxygenated organic compound," or the like expression, as herein used, embraces only those substances which are classified as glycols, phenols, aldehydes, quinones, ketones and organic acids.

I have found that when an unsaturated organic compound is treated with hydrogen peroxide, in the presence of an essentially anhydrous inert organic solvent and of a small amount of a catalytically active oxide of a metal known to form very unstable paracids including Os, Ti, Zr, Th, V, Nb, Ta, Cr, Mo, W, U and Ru—(see J. A. C. S., 59, pages 2342 and 2343; and Berichte, 41 (1908), page 3536), preferably, osmium tetroxide, ruthenium tetroxide, vanadium pentoxide, molybdenum oxide or chromium trioxide, in an essentially non-alkaline environment (that is, in the absence of an inorganic base), there is produced an oxygenated organic compound, the nature of which depends upon the particular type of unsaturated compound subjected to such treatment, the temperature, the pressure (if the compound treated be in gaseous phase), the solvent medium, the extent of oxidation and other such factors. For example, olefins and their derivatives invariably yield glycols which may be further oxidized to produce aldehydes, ketones and/or organic acids, and acetylene and its mono- or di-substitution products yield hydroxy aldehydes and/or hydroxy acids. In the case of benzenoid hydrocarbons the glycols produced dehydrate to yield phenols which may be further oxidized to produce quinones.

I have successfully produced substantially good yields of ethylene glycol from ethylene, propylene glycol from propylene, isobutylene glycol from isobutylene, glycollic acid from acetylene, trimethyl ethylene glycol from tri-methyl ethylene, pinacol from tetramethyethylene, 2-methyl butane diol-1,2 from 2-methyl butene-1, pentane diol-2,3 from pentene-2, cetene glycol from cetene, hexane tetrol-1,2,5,6, from di-allyl, phenyl glycol from styrene, cis-cyclohexane diol-1,2, adipic aldehyde and adipic acid from cyclohexene, p-menthane tetrol-1,2,8,9 from d-limonene, cyclopentenediol-1,4 and cyclopentanetetrol-1,2,3,4, from cyclopentadiene, ethyl dihydroxybutyrate from ethyl crotonate, diethyl mesotartrate from diethyl maleate, diethyl racemate from diethyl fumarate, 2-methyl-pentene-diol-2,3-one-4 from mesityl oxide, glycol-aldehyde from vinyl acetate, glycolaldehyde from divinyl ether, glycolaldehyde from vinyl bromide, 9,10-dihydroxy-stearic acid from oleic acid, beta-phenylglycerol and di-(beta-phenylglycerol) ether from cinnamyl alcohol, phenol from benzene, cresols from toluene, naphthaquinone from naphthalene, anthraquinone from anthracene, phenanthrenequinone from phenanthrene, glycerol from allyl alcohol, phenyl glyceric acid from cinnamic acid, di-hydroxybutyric acid from crotonic acid, mesotartaric acid from maleic acid, racemic acid from fumaric acid, anisaldehyde and anisic acid from anethol, vanillin from isoeugenol, piperonal from isosafrole, homopiperonal from safrole, di-hydroxy-stearic acid from oleic acid, etc.

The reaction of the various types of olefins with hydrogen peroxide, in accordance with the present invention, may therefore be generalized by the following equations:

I. (Monosubstituted olefins)

(a) 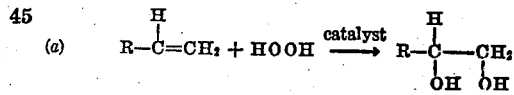

wherein R represents a monovalent organic radical of the group consisting of alkyl and aryl radicals.

Further oxidation of the glycol thus formed produces aldehydes, as follows:

(b) 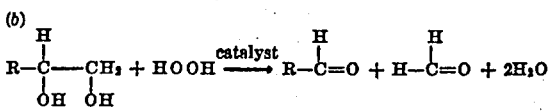

and still further oxidation results in the formation of organic acids, as follows:

(c) 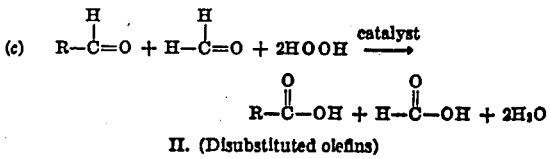

II. (Disubstituted olefins)

(a) 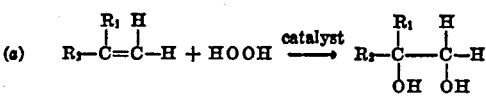

wherein $R_1$ and $R_2$ represent monovalent organic radicals of the group consisting of alkyl and aryl radicals.

Further oxidation of the glycol thus formed produces a ketone and an aldehyde, as follows:

(b) 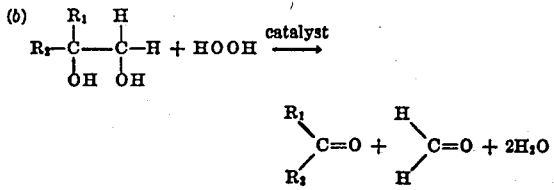

and the aldehyde may be further oxidized to produce formic acid.

III. (Trisubstituted olefins)

(a) 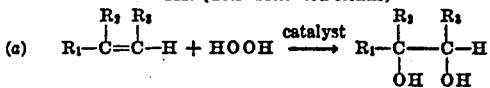

wherein $R_1$, $R_2$ and $R_3$ represent monovalent organic radicals of the group consisting of alkyl and aryl radicals.

Oxidation of the glycol thus formed produces a ketone and an aldehyde, as follows:

(b) 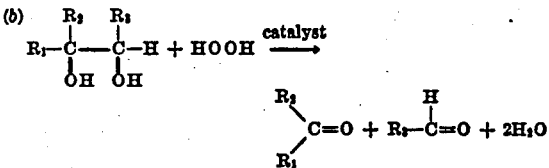

and the aldehyde may be further oxidized to produce an organic acid as in I (c).

IV. (Tetrasubstituted olefins)

(a) 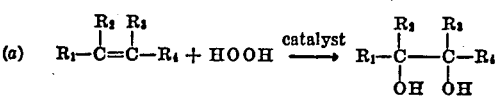

wherein $R_1$, $R_2$, $R_3$ and $R_4$ represent monovalent organic radicals of the group consisting of alkyl and aryl radicals.

This type of glycol may be oxidized to produce ketones, as follows:

(b) 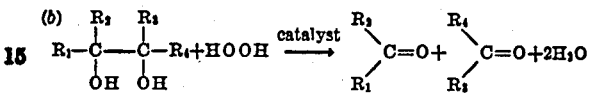

The reaction of hydrogen peroxide and ethylene, a typical olefin, to produce ethylene glycol proceeds as follows:

V. 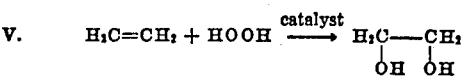

Although further oxidation of ethylene glycol yields formaldehyde which may be oxidized to formic acid as illustrated in Equations I (a) and I (b), this does not take place to a great degree, since yields of glycol as high as 97% have been produced.

Similarly, the reaction of the aforesaid acetylenic compounds and hydrogen peroxide may be illustrated by the following equations:

VI. (Monosubstituted acetylene)

(a) 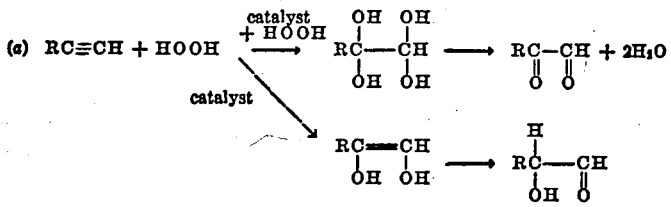

wherein R represents a monovalent organic radical of the group consisting of alkyl and aryl radicals.

The hydroxy and keto aldehydes thus formed may be oxidized further to produce organic acids as follows:

(b) 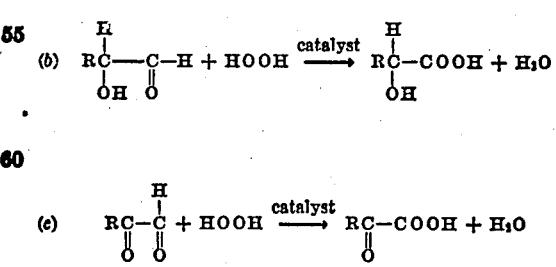

(c) 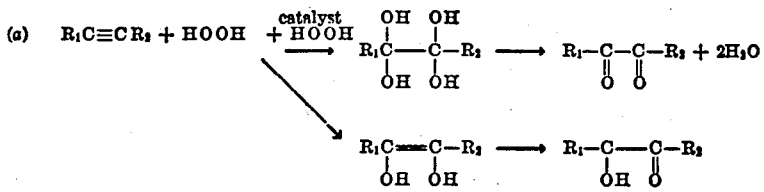

VII (Disubstituted acetylene)

(a)

wherein $R_1$ and $R_2$ represent monovalent organic radicals of the group consisting of alkyl and aryl radicals.

VIII. The reaction of hydrogen peroxide and acetylene ($C_2H_2$) to produce (a) glyoxal and glycollic aldehyde, (b) glycollic acid, and (c) oxalic acid may proceed as follows:

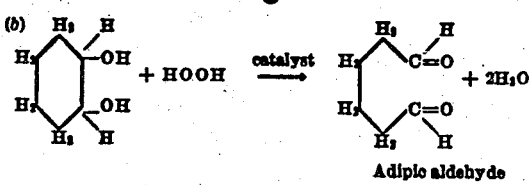

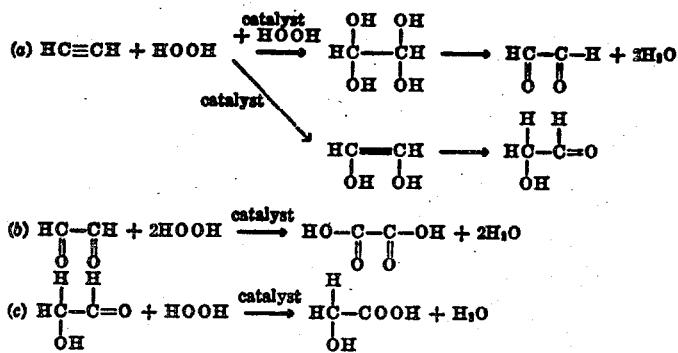

IX. For cyclohexene the addition of hydrogen peroxide proceeds as follows:

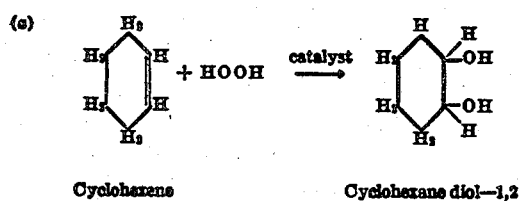

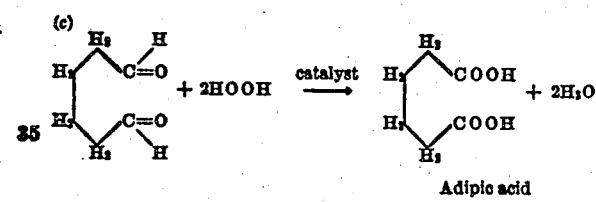

X. For benzene, toluene, naphthalene, anthracene, phenanthrene and the like, the addition of hydrogen peroxide may be illustrated as follows:

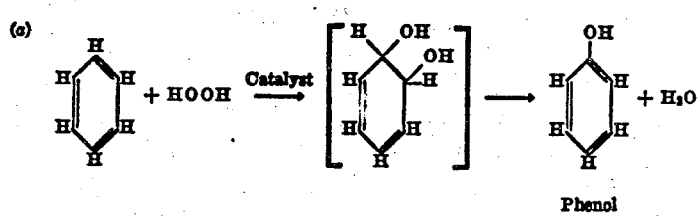

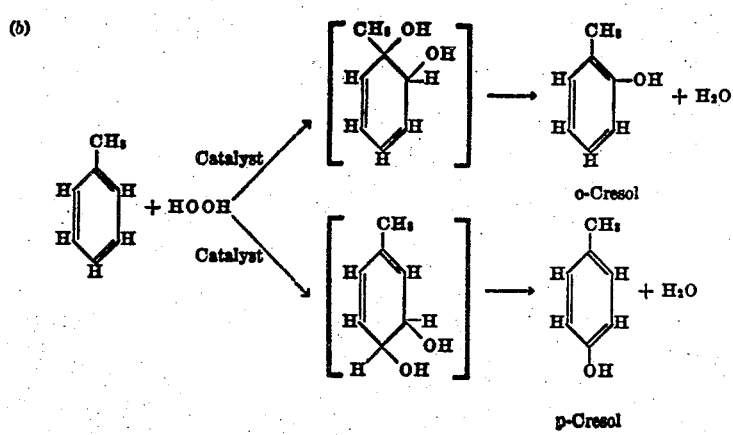

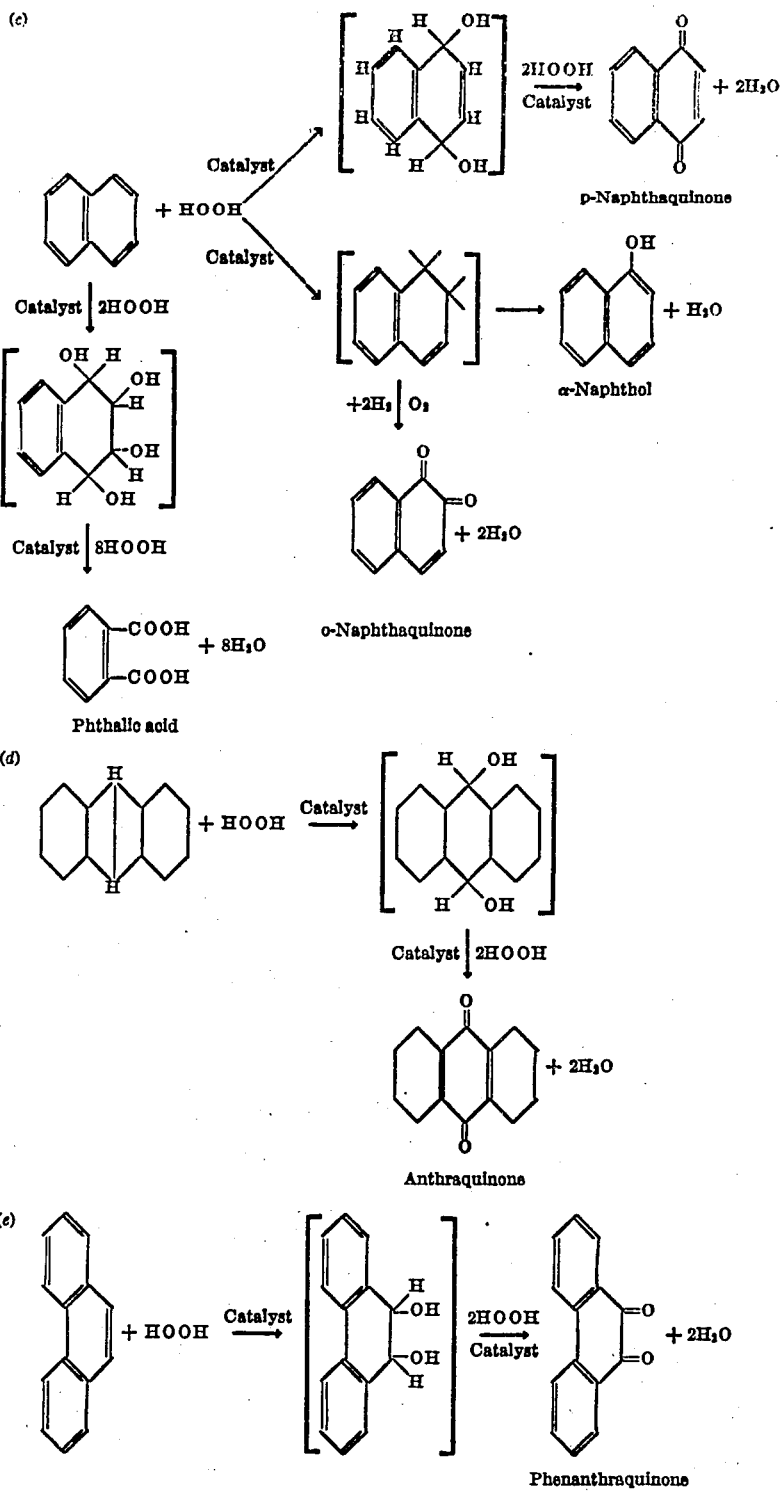

In carrying out my process successfully, it is advisable to employ substantially anhydrous solvents, preferably selected from such organic substances that do not undergo oxidation during the reaction. Tertiary alcohols, in general, and particularly tertiary butyl and tertiary amyl alcohols, have been found to be suitable solvents for this purpose, although it is to be understood that the invention is not confined to these solvents since various other reagents, such as nitriles and certain types of ethers, acetic acid-tertiary alcohol mixtures, etc., may be used to advantage. Illustrative of operable nitriles is acetonitrile. Illustrative examples of operable ethers include: ethyl, propyl, butyl and amyl dioxane, ethers of ethylene glycol and diethylene glycol, etc. Among operable inert (that is, unreactive) organic solvent media is nitromethane. The organic solvent employed is, in all cases, strictly a medium or vehicle, and is not a reactant.

The reaction mixture (material to be oxidized, the hydrogen peroxide treating agent, the organic solvent medium—where used—and the catalyst) preferably is initially substantially anhydrous.

A preferred procedure for the preparation of the hydrogen peroxide reagent in tertiary butyl alcohol is as follows:

400 cc. of pure tertiary butyl alcohol is added to 100 cc. of 30% hydrogen peroxide (Albone C), and the solution treated with small portions of anhydrous sodium sulphate, thereby forming two layers. The alcohol layer, containing most of the hydrogen peroxide, is removed. The so separated hydrogen peroxide-rich layer may be used without further treatment; however, I may further dehydrate the same by treating it with more anhydrous sodium sulphate, and finally with anhydrous calcium sulphate or magnesium sulphate. A solution containing approximately 6% hydrogen peroxide in tertiary butyl alcohol is thus obtained, and this solution may be concentrated by vacuum distillation of the alcohol at room temperature to any desired concentration without loss of the peroxide, provided an all-glass or other suitable apparatus is employed.

An osmium tetroxide catalyst may be prepared by dissolving substantially anhydrous osmium tetroxide in substantially pure tertiary butyl alcohol, free from isobutylene.

A chromium trioxide catalyst similarly may be prepared by dissolving substantially anhydrous chromic acid ($CrO_3$) in a substantially pure saturated tertiary aliphatic alcohol ($C_nH_{2n+1}$)$_3$COH, e. g., substantially pure tertiary butyl or amyl alcohol, or in a substantially anhydrous mixture of acetic acid and a tertiary alcohol; or, the substantially anhydrous $CrO_3$ may be added directly in the solid form to the substantially anhydrous medium containing hydrogen peroxide and the substance to be hydroxylated. Preparation of the other catalytic metal oxides may similarly be formed by dissolving the metal oxide in one or another of the organic solvents above stated. Or, the selected catalytic metal oxide may be added, in powdered or finely divided state, to the hydrogen peroxide reagent wherein the same eventually dissolves forming a completely homogeneous solution. The catalyst may be used alone or in combination.

I have found that the temperature plays an important role in directing the type of oxygenated product to be formed. For example, formation of glycols in high yields is usually favored between room temperature (e. g., 21° C.) and several degrees below 0° C., whereas aldehydes, ketones and organic acids are produced more advantageously at temperatures higher than room temperature (e. g., between 21° C. and the boiling point of the non-aqueous solvent employed).

The following examples are illustrative of the application of the invention:

1.—GASEOUS UNSATURATED SUBSTANCE

For the production of ethylene glycol or of any glycol from any unsaturated gaseous substance, the latter may be bubbled through the peroxide reagent containing any one of the catalysts above suggested, or any combination of them, or it may be introduuced under pressure of various magnitudes from one to several atmospheres or even several hundred atmospheres. The end of the reaction is usually indicated by a color change or by the complete utilization of the peroxide as determined by titration. The glycol or other products may be separated by fractionation or in any other suitable manner. Using the procedure herein disclosed I have succeeded in producing 97% of ethylene glycol from ethylene; 68% of propylene glycol from propylene; 38–40% of isobutylene glycol from isobutylene using chromic acid, vanadium pentoxide or molybdenum oxide as catalyst; and, using osmium tetroxide as catalyst, over 30% glycollic acid from acetylene.

2.—LIQUID AND SOLID UNSATURATED SUBSTANCES (a) *Hydrocarbons*

The unsaturated hydrocarbons are dissolved or mixed with the peroxide reagent containing a suitable catalyst of the type previously suggested and the reaction is allowed to proceed either at or below room temperature if glycols are desired, or above room temperature if aldehydes, ketones and organic acids are desired. The hydrocarbons may be present preferably in the ratio of one mole to one or two moles of the peroxide, although greater excess of peroxide is necessary when aldehydes, ketones and acids are desired. The speed of the reaction up to certain limits depends upon the concentration of the catalyst which may be present preferably in concentrations from .05 g. to .5 g. per mole of the substance to be oxidized, although it is to be understood that these limits may at times be exceeded without affecting appreciably the yields of the oxygenated products. The end of the reaction is usually indicated by a color change or by the absence of peroxide. The glycols or other oxygenated products may then be separated either by fractionation or in any other well known manner. Using this general procedure I have succeeded in producing over 30% of pentane diol-2,3 from pentene-2; 38% of trimethyl ethylene glycol from trimethyl ethylene; 51% of 2-methyl butane diol-1,2 from 2-methyl butene-1; 82% of cetene glycol from cetene; over 50% of phenyl glycol from styrene; 58% cyclohexane diol-1,2 and about 35% adipic acid from cyclohexene; 45% of hexane tetrol-1,2,5,6 from di-allyl; 35% of p-menthane tetrol-1,2,8,9 from limonene; 22–30% phenol from benzene; about 30% of cresols from toluene; and almost quantitative yield of anthraquinone from anthracene. The yields in all cases were based on the amount of hydrocarbon used up in the reaction.

(b) *Miscellaneous*

Using the same procedure as in the foregoing examples, I have produced 60% glycerol from allyl alcohol; 54% of α,β-dihydroxy butyric acid from crotonic acid; 56% of phenyl glyceric acid from cinnamic acid; 48% of racemic acid from fumaric acid; over 30% mesotartaric acid from maleic acid; 60% 9,10-dihydroxy stearic acid from oleic acid; 57% of diethyl racemate from diethyl fumarate; 55% of anisaldehyde from anethol; 66% of vanillin from isoeugenol; 68% yield of piperonal from isosafrole; and 44% of homopiperonal from safrole. In the case of some essential oils in which the double bonds are very active, the oxidation is apt to go beyond the glycol state, although it may be controlled to produce the glycol.

The invention is more particularly described and further illustrated in the following:

*Mesotartaric acid from maleic acid.*—To 2.9 g. (0.025 mole) of maleic acid were added 27.2 cc. (0.05 mole) of 6.3% solution of hydrogen peroxide in anhydrous tertiary butyl alcohol and .2 cc. osmium tetroxide solution in tertiary butyl alcohol, and the mixture was allowed to stand overnight at room temperature. The reaction was complete on the following day when the solvent was removed under reduced pressure and the residue dissolved in water. The solution was then made ammoniacal, heated to boiling and treated with excess 10% calcium chloride solution, whereby the calcium oxalate and mesotartrate precipitated out. This precipitate was removed, dried and weighed: yield 1.9 g. To remove the calcium mesotartrate, the precipitate was extracted with 20% sodium hydroxide solution. This separation yielded 1.2 g. of calcium mesotartrate and 0.7 g. of calcium oxalate. The calcium mesotartrate was further purified by reprecipitation and analyzed.

The yield of mesotartaric acid was 30.3%, and that of oxalic acid 14.6%, of the 1.9 g. of maleic acid consumed in the reaction.

*Vanillin from isoeugenol.*—Five grams of isoeugenol was mixed with 45 cc. of 6.3% solution of hydrogen peroxide in anhydrous tertiary amyl alcohol and 0.02 g. of vanadium pentoxide. The catalyst went into solution, which heated up spontaneously. The reaction was complete in about twelve hours when the mixture had become more intensely red. An analysis for the presence of vanillin by precipitating the p-nitrophenylhydrazone gave a yield of 66% of vanillin.

*Anisaldehyde from anethole (p-methoxypropenyl benzene).*—To 5 g. of anethole were added 45 cc. of 6.3% solution of hydrogen peroxide in anhydrous tertiary amyl alcohol and 0.02 g. of vanadium pentoxide. The catalyst went slowly into solution, which heated up almost to the boiling point of the solvent. The reaction was over in about two hours when the mixture became deep red and the peroxide had completely disappeared. Considerable amounts of acetaldehyde vapor came off during the reaction. The solvent was then removed under reduced pressure and the residue dissolved in glacial acetic acid. Aliquot parts of this were analyzed for anisaldehyde. The yield of anisaldehyde amounted to 55%. In addition to anisaldehyde some anisic acid was isolated from the reaction, and a small amount of a deep red solid which is presumably an addition product of vanadium pentoxide with anisaldehyde.

*Phenol from benzene.*—Fifteen and six-tenths grams of benzene (thiophene-free) was mixed with an equimolecular quantity of the hydrogen peroxide solution and 0.04 g. of vanadium pentoxide. The catalyst went slowly into solution which, after a few hours, acquired a blood red color. At the end of twenty-four hours, the reaction was complete, the red color had disappeared, and the catalyst separated out as a dark green precipitate. The mixture was then filtered, the filtrate fractionated to remove the solvent and the unused benzene (13 g.), the residue dissolved in water, and the amount of phenol estimated by precipitating the insoluble tribromophenol. Two and nine-tenths grams of tribromophenol was obtained corresponding to 30% yield of phenol calculated on the basis of the amount of benzene used. A sample of tribromophenol was recrystallized from dilute alcohol, M. P. 93°, and showed no depression upon mixing with an authentic sample of tribromophenol.

*Cyclopentene-2-diol-1,4 from cyclo-pentadiene.*—A solution of 0.85 mole of hydrogen peroxide in 560 cc. of tertiary butyl alcohol (anhydrous) was cooled to about 2° C. and then mixed with 51 g. (0.773 mole) of freshly distilled cyclopentadiene (B. P. 40–43° under total reflux) and 5 cc. of a 0.5% solution of osmium tetroxide in tertiary butyl alcohol. The reaction was complete at 0° in three days. The solvent was then removed from the reaction mixture by distillation under reduced pressure and in an atmosphere of nitrogen, and the dark brown, viscous residue was repeatedly extracted first with petroleum ether and then with ethyl ether. Finally, the residue was fractionated under reduced pressure and 23.7 g. of a fraction boiling at 80–83° (1 mm.) was collected and found to consist essentially of cyclopentene-2-diol-1,4.

This glycol is a pale yellow, highly viscous liquid, soluble in water, alcohol and ethyl acetate; insoluble in ether, benzene and other hydrocarbon solvents. It rapidly reduces ammoniacal silver nitrate in the cold, and instantly decolorizes bromine water. It is not a ketonic substance. It is believed that the product is the cis isomer

since a benzylidene derivative was obtained by condensation of the unsaturated glycol with benzaldehyde in accordance with the method of Platt and Hibbert (Can. J. Res., vol. 7, 1932, p. 629).

The aforesaid residue contained also a minor amount (about 5–10%) of cyclopentanetetrol-1,2,3,4. This latter compound is an amorphous, slightly colored, very hygroscopic solid (having no definite melting point, turning brown at 190° C. and black at 200° C.); soluble in water and alcohol but insoluble in ether, ethyl acetate and various hydrocarbon solvents.

*Glycolaldehyde from vinyl acetate.*—To 17.7 g. of vinyl acetate (B. P. 72.5–73°) was added 110 cc. of 6.23% solution of hydrogen peroxide in tertiary butyl alcohol; the mixture was cooled to 0°, and to it was added 1 cc. of a solution of osmium tetroxide in tertiary butyl alcohol. After five days at 0° the reaction was complete (reaction mixture turned brown, and peroxide had completely disappeared), whereupon the reaction mixture was distilled to remove unconverted vinyl acetate and the solvent. There was obtained a yield of 60% of glycolaldehyde

based on the amount of vinyl acetate consumed.

*9.10 dihydroxystearic acid from oleic acid.*— 7 g. of oleic acid, B. P. 230–235 (21 mm.), was mixed with 14.3 cc. of a 5.95% solution of hydrogen peroxide in tertiary butyl alcohol; the mixture was cooled to 0°, and to it was added 0.5 cc. of a solution of osmium tetroxide in tertiary butyl alcohol. The solution became orange in color, but after standing over night at 0° it turned colorless and the reaction was complete. A considerable amount of 9,10-dihydroxystearic acid had precipitated. The solvent was removed under reduced pressure and the residue was washed thoroughly with ether to remove any unconverted oleic acid. The washed, solid, product was recrystallized from absolute alcohol: M. P. 129–131° corr.). Its neutralization equivalent was found to be 319. The yield amounted to 60%.

This application contains subject-matter in common with my application Serial No. 382,273, now abandoned, filed March 7, 1941, and is a continuation-in-part thereof.

I claim:

1. Process for the direct production of polyhydroxy derivatives of unsaturated hydrocarbons containing at least one olefinic linkage, which comprises treating the hydrocarbon with hydrogen peroxide in a neutral and initially substantially anhydrous environment and in the presence of a catalytically active oxide of a metal which forms unstable per-acids, and recovering the resulting polyhydroxy derivative from the reaction mixture.

2. Process for the direct production of polyhydroxy derivatives of unsaturated hydrocarbons containing at least one olefinic linkage, which comprises treating the hydrocarbon with a neutral and initially substantially anhydrous solution of hydrogen peroxide in the presence of a catalytically active oxide of a metal which forms unstable per-acids, and recovering the resulting polyhydroxy derivative from the reaction mixture.

3. Process for the direct production of polyhydroxy derivatives of unsaturated hydrocarbons containing at least one olefinic linkage, which comprises treating the hydrocarbon with a neutral and initially substantially anhydrous solution of hydrogen peroxide in an inert organic solvent medium in the presence of a catalytically active oxide of a metal which forms unstable per-acids, and recovering the resulting polyhydroxy derivative from the reaction mixture.

4. Process for the direct production of polyhydroxy derivatives of unsaturated hydrocarbons containing at least one olefinic linkage, which comprises treating the hydrocarbon with a neutral and initially substantially anhydrous solution of hydrogen peroxide in a solvent medium essentially consisting of a tertiary monohydric saturated aliphatic alcohol in the presence of a catalytically active oxide of a metal which forms unstable per-acids, and recovering the resulting polyhydroxy derivative from the reaction mixture.

5. Process for the direct production of polyhydroxy derivatives of olefins, which comprises treating the olefin with a neutral and initially substantially anhydrous solution of hydrogen peroxide in an inert organic solvent medium in the presence of a catalytically active oxide of a metal which forms unstable per-acids, at a temperature below the boiling point of a solvent medium, and recovering the resulting polyhydroxy derivative of the olefin from the reaction mixture.

6. Process for the direct production of polyhydroxy derivatives of diolefins, which comprises treating the diolefin with a neutral and initially substantially anhydrous solution of hydrogen peroxide in an inert organic solvent medium in the presence of a catalytically active oxide of a metal which forms unstable per-acids, at a temperature below the boiling point of the solvent medium, and recovering the resulting polyhydroxy derivative of the diolefin from the reaction mixture.

7. Process for the direct production of a polyhydroxy derivative of an unsaturated aliphatic hydrocarbon containing a conjugated system of double bonds, which comprises treating the hydrocarbon with an initially substantially anhydrous solution of hydrogen peroxide in the presence of a catalytically active oxide of a metal which forms unstable per-acids, and recovering the resulting polyhydroxy derivative from the reaction mixture.

8. Process for the direct production of a product consisting mostly of cyclopentene-2-diol-1,4(cis) from cyclopentadiene, which comprises treating cyclopentadiene with a neutral and initially substantially anhydrous solution of hydrogen peroxide in an inert organic solvent medium in the presence of a catalytically active oxide of a metal which forms unstable per-acids, at a temperature below normal room temperature, and recovering the resulting diol from the reaction mixture.

9. Process for the direct production of isobutylene glycol from isobutylene, which comprises treating isobutylene with a neutral and initially substantially anhydrous solution of hydrogen peroxide in an inert organic solvent medium in the presence of a catalytically active oxide of a metal which forms unstable per-acids, and recovering the resulting isobutylene glycol from the reaction mixture.

10. Process for the direct production of hexanetetrol-1,2,5,6 from di-allyl, which comprises treating di-allyl with a neutral and initially substantially anhydrous solution of hydrogen peroxide in an inert organic solvent medium in the presence of a catalytically active oxide of a metal which forms unstable per-acids, and recovering the resulting hexanetetrol-1,2,5,6 from the reaction mixture.

11. As a new product, cyclopentene-2-diol-1,4(cis).

NICHOLAS A. MILAS.

REFERENCES CITED

The following references are of record in the file of this patent:

FOREIGN PATENTS

| Number | Country | Date |
|---|---|---|
| 508,526 | Great Britain | July 3, 1939 |

OTHER REFERENCES

Milas et al.: "Jour. Am. Ch. Soc.," vol. 58, pages 1302–1304 (1936); vol. 59, pages 543–544 (1937); vol. 59, pages 2342–2347 (1937); vol. 61, pages 1844–1847 (1939); vol. 62, pages 1841–1843 (1940).

"Chemical Abstracts"; vol. 15, p. 237 (1921), abstract of article by Boeseken et al. in "Proc. Acad. Sci. Amsterdam"; vol. 23, pp. 69–73 (1920); vol. 24, pp. 5286–7 (1930), abstract of article by Criegee in "Ann.," vol. 481, pp. 263–302 (1920); vol. 32, col. 122 (1938), abstract of article by Dane et al. in "Ann.," vol. 532, pp. 29–38 (1937).

Criegee: "Annalen der Chemie," vol. 522, pages 94–96 (1936).

Dane et al.: Ibid., vol. 532, pages 29–35 (1937).